United States Patent
Pradier et al.

(10) Patent No.: US 7,898,487 B2
(45) Date of Patent: Mar. 1, 2011

(54) UNDERCARRIAGE FITTED WITH A COMMUNICATION DEVICE BETWEEN A WHEEL AND THE UNDERCARRIAGE

(75) Inventors: Jean-Clair Pradier, Houilles (FR); Thomas Lavaud, Meudon (FR)

(73) Assignee: Ssagem Defense Securite, Paris (FR)

( * ) Notice: Subject to any disclaimer, the term of this patent is extended or adjusted under 35 U.S.C. 154(b) by 165 days.

(21) Appl. No.: 12/133,484

(22) Filed: Jun. 5, 2008

(65) Prior Publication Data

US 2008/0303726 A1 Dec. 11, 2008

(30) Foreign Application Priority Data

Jun. 7, 2007 (FR) .................................. 07 04089

(51) Int. Cl.
*H01Q 1/32* (2006.01)
(52) U.S. Cl. ..................... 343/717; 343/711; 343/705
(58) Field of Classification Search ............... 343/705, 343/711, 717; 244/100 R, 102 R, 103 R; 340/960, 445, 448; 324/207.2
See application file for complete search history.

(56) References Cited

U.S. PATENT DOCUMENTS

| | | | |
|---|---|---|---|
| 6,902,136 B2 * | 6/2005 | Mackness | 244/100 R |
| 7,490,793 B2 * | 2/2009 | Mackness | 244/100 R |
| 7,564,414 B2 * | 7/2009 | Locatelli et al. | 343/711 |
| 7,589,620 B2 * | 9/2009 | Pradier et al. | 340/448 |

FOREIGN PATENT DOCUMENTS

| | | |
|---|---|---|
| EP | 1 790 503 A1 | 5/2007 |
| FR | 2 809 674 A1 | 12/2001 |
| WO | 02/096681 A1 | 12/2002 |

\* cited by examiner

*Primary Examiner*—Hoang V Nguyen
(74) *Attorney, Agent, or Firm*—Sughrue Mion, PLLC

(57) ABSTRACT

The invention relates to an aircraft undercarriage including at least one axle having at least one wheel mounted to rotate thereon, the undercarriage including a communication device for connecting a sensor mounted on a rim of the wheel to stationary processor means mounted on the aircraft. According to the invention, the communication device comprises firstly an antenna secured to the sensor and thus rotating together with the wheel, and secondly a stationary antenna extending at the end of the axle and connected to the processor means, the two antennas being in radio communication through a cover of non-conductive material secured to the wheel and covering the end of the axle.

4 Claims, 2 Drawing Sheets

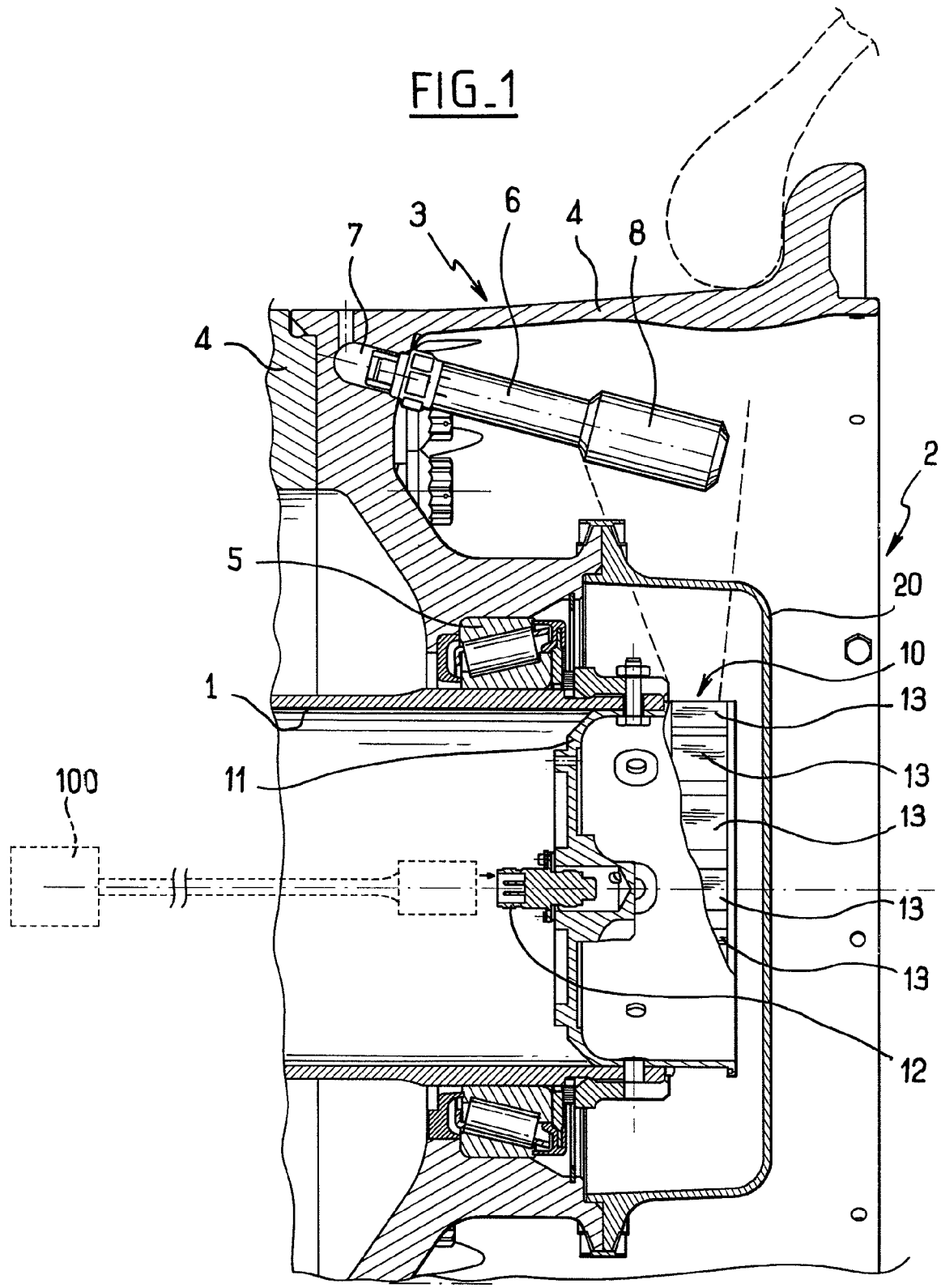

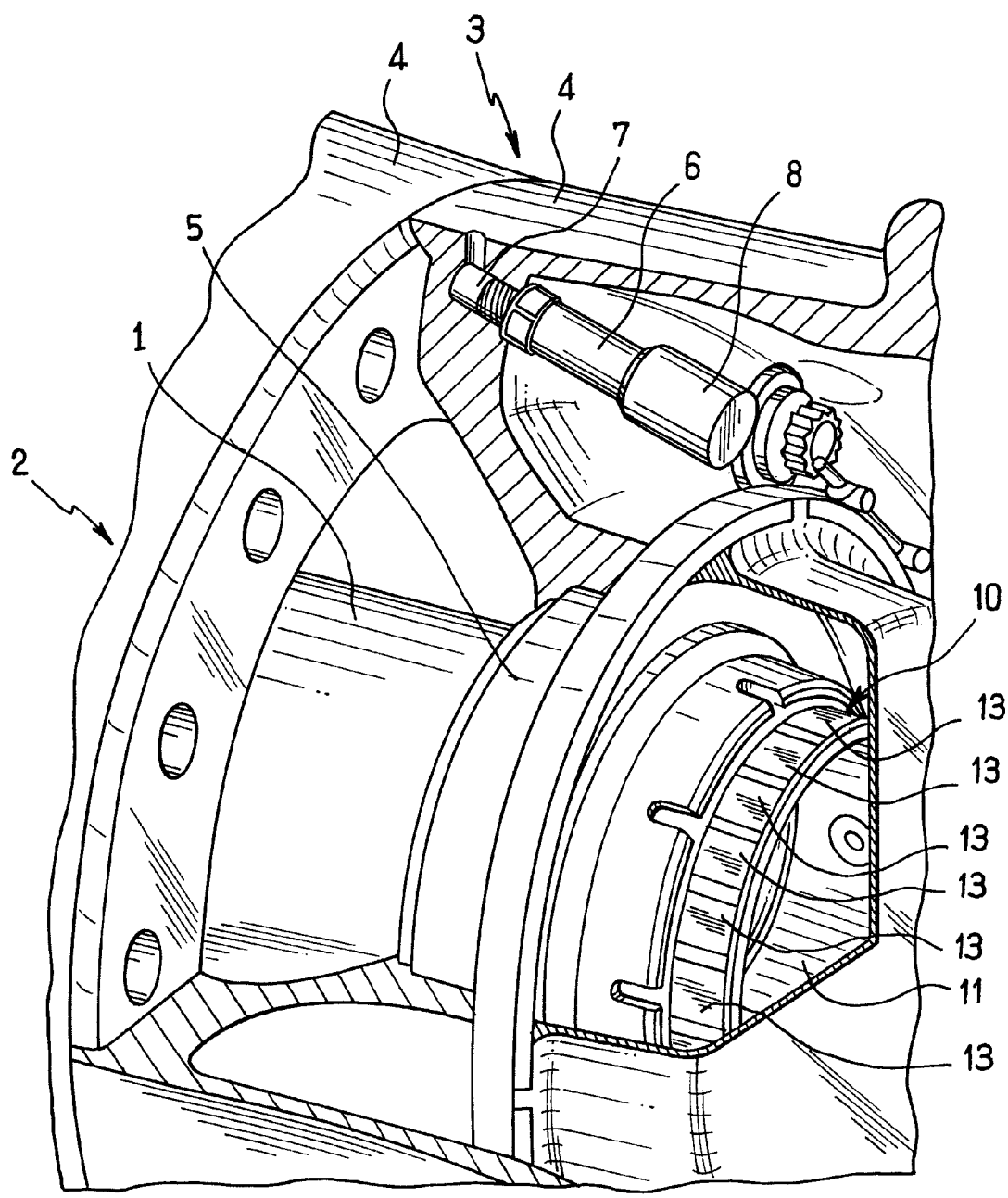
FIG_2

UNDERCARRIAGE FITTED WITH A COMMUNICATION DEVICE BETWEEN A WHEEL AND THE UNDERCARRIAGE

The invention relates to an undercarriage fitted with a communication device between the undercarriage and a wheel carried thereby.

BACKGROUND OF THE INVENTION

Aircraft undercarriages are known that include at least one axle having at least one wheel mounted to rotate thereon, the undercarriage including a communication device for connecting a sensor mounted on a rim of the wheel to stationary processor means mounted on the aircraft. In order to do this, the processor means are connected to a stationary antenna located at the end of the axle, while the sensor includes an antenna that enables the sensor to communicate without contact and by radio with the stationary antenna. Nevertheless, the end of the axle is generally protected by a metal cover secured to the wheel. In order to enable the two antennas to communicate, it is appropriate to fit the cover with a passive intermediate element that includes a radiative element facing the stationary antenna and a radiative element facing the antenna of the sensor.

In general, the stationary antenna extends all around the end of the axle, and the radiative element is circular and disposed facing the stationary antenna on the axis of the wheel, such that the facing stationary antenna and radiative elements interact electromagnetically in a manner that does not depend on the angular position of the wheel. All of the radiation from the stationary antenna influences the facing radiative element.

OBJECT OF THE INVENTION

An object of the invention is to provide an undercarriage with a simplified device for communication between the sensor and the stationary antenna.

BRIEF SUMMARY OF THE INVENTION

According to the invention, there is provided an aircraft undercarriage including at least one axle having at least one wheel mounted to rotate thereon, the undercarriage including a communication device for connecting a sensor mounted on a rim of the wheel to stationary processor means mounted on the aircraft. According to the invention, the communication device comprises firstly an antenna secured to the sensor and thus rotating together with the wheel, and secondly a stationary antenna extending at the end of the axle and connected to the processor means, the two antennas being in radio communication through a cover of non-conductive material secured to the wheel and covering the end of the axle.

Thus, the cover is transparent to the electromagnetic waves used, and the antennas are directly in communication without it being necessary to use an intermediate passive element passing through the cover. The communication device is thus considerably simplified and made lighter in weight.

Naturally, the stationary antenna needs to radiate in all radial directions since the information from the sensor must be capable of passing regardless of the angular position of the wheel. Such a disposition thus implies that only a fraction of the radiation reaching the sensor is picked up by the antenna of the sensor. Nevertheless, such a sensor can operate while picking up very low levels energy. Thus, although a priori less favorable from the electromagnetic point of view than the prior art device, the device of the invention is nevertheless advantageous in that it is significantly simpler than the prior art devices.

Preferably, the stationary antenna comprises a plurality of printed flat radiating elements disposed circumferentially in such a manner that the antenna of the sensor is continuously in radio connection with at least one of the radiating elements, regardless of the angular position of the wheel.

These printed flat radiating elements are particularly simple to implement and they contribute significantly to reducing the cost of the communication device.

BRIEF DESCRIPTION OF THE DRAWINGS

The invention can be better understood in the light of the following description with reference to the accompanying drawings, in which:

FIG. 1 is a fragmentary longitudinal section view of the bottom portion of an undercarriage, showing a wheel mounted on an axle of the undercarriage and fitted with a communication device constituting a particular embodiment of the invention; and FIG. 2 is a cutaway fragmentary perspective view of the undercarriage shown in FIG. 1.

DETAILED DESCRIPTION OF THE INVENTION

With reference to the figures, the undercarriage comprises an axle 1, of which there can be seen the end that carries a wheel 2. In conventional manner, the wheel 2 comprises a rim 3 constituted by two half-rims 4 and receiving a tire (represented by dashed lines). The rim 3 is received to rotate via conical roller bearings 5 (only one of which is visible). A pressure sensor 6 is installed on one of the half-rims, being screwed into an orifice 7 that opens out into the tire in order to measure the pressure that exists inside it. The sensor is fitted with an antenna 8 at its free end. The pressure sensor 6 does not have a source of energy.

The axle 1 carries a stationary antenna 10 at its end, which antenna extends around the axle. Here the stationary antenna 10 is mounted on a plug 11 inserted in the axle and carrying a connector 12 for connecting the antenna 10 to processor means 100 mounted on the aircraft. In a preferred embodiment, the stationary antenna 10 comprises a plurality of printed radiating elements 13 disposed in such a manner that they extend over the entire circumference of the plug 11, immediately outside the axle 1. These radiating elements 13 (also known as "patch" antennas) are themselves known and serve to radiate high frequency signals.

The end of the axle 1 is protected by a cover 20 secured to the rim 3 and rotating therewith. The cover 20 is made of a material that is not conductive and that is transparent to the electromagnetic waves used for communication between the stationary antenna 10 and the antenna 8 of the pressure sensor 6. For example, the cover may be made of a non-conductive plastics material.

The device operates as follows: when the tire pressure is to be measured, a current is sent to the stationary antenna 10. Each of the radiating elements 13 then radiates an electromagnetic wave that propagates through the cover, so that a fraction of this radiated wave reaches the antenna 10 of the pressure sensor 6. The antenna 8 converts the wave into electricity that powers the pressure sensor 6, which in turn measures the pressure. The pressure data is then returned by radio wave to the stationary antenna 10 in order to be sent to the processor means 100.

Advantageously, the radiating elements are located quite close to one another so that in an angular zone extending between two adjacent radiating elements 13, the sum of the fields radiated by the two adjacent radiating elements is substantially constant, thereby ensuring satisfactory efficiency in communication between the stationary antenna and the antenna of the sensor, regardless of the angular position of the wheel.

The invention is not limited to the above description, but on the contrary covers any variant coming within the ambit defined by the claims.

In particular, although it is stated that the stationary antenna comprises flat radiating elements, it is possible to use other types of antenna, e.g. an antenna formed by a coil of radiating wire. In addition, although it is stated that the stationary antenna is carried by a plug fitted to the end of the axle, it would also possible to place the stationary antenna directly on the end of the axle. Either way, it is important for the antenna to extend at the end of the axle so as to be able to communicate with the antenna of the sensor. In FIG. 1, dashed lines represent the range covered by the radiation from the stationary antenna. It can be seen that the antenna of the sensor lies in this range. It is also possible to rely on the wave generated by one of the antennas being reflected on the inside face of the rim in order to return towards the other antenna.

What is claimed is:

1. An aircraft undercarriage including at least one axle having at least one wheel mounted to rotate thereon, the undercarriage including a communication device for connecting a sensor mounted on a rim of the wheel to stationary processor means mounted on the aircraft, wherein the communication device comprises a first antenna secured to the sensor and thus rotating together with the wheel, and a stationary second antenna extending at the end of the axle and connected to the processor means, the first and second antennas being in direct radio communication through a cover of non-conductive material secured to the wheel and covering the end of the axle.

2. An undercarriage according to claim 1 wherein the two antennas are in direct communication, without any intermediate antenna.

3. An aircraft undercarriage including at least one axle having at least one wheel mounted to rotate thereon, the undercarriage including a communication device for connecting a sensor mounted on a rim of the wheel to stationary processor means mounted on the aircraft, wherein the communication device comprises a first antenna secured to the sensor and thus rotating together with the wheel, and a stationary second antenna extending at the end of the axle and connected to the processor means, the first and second antennas being in radio communication through a cover of non-conductive material secured to the wheel and covering the end of the axle, in which the stationary antenna comprises a plurality of printed flat radiating elements disposed circumferentially in such a manner that the antenna of the sensor is continuously in radio connection with at least one of the radiating elements, regardless of the angular position of the wheel.

4. An undercarriage according to claim 3 wherein two antennas are in direct communication, without any intermediate antenna.

* * * * *